United States Patent Office 2,778,314
Patented Jan. 22, 1957

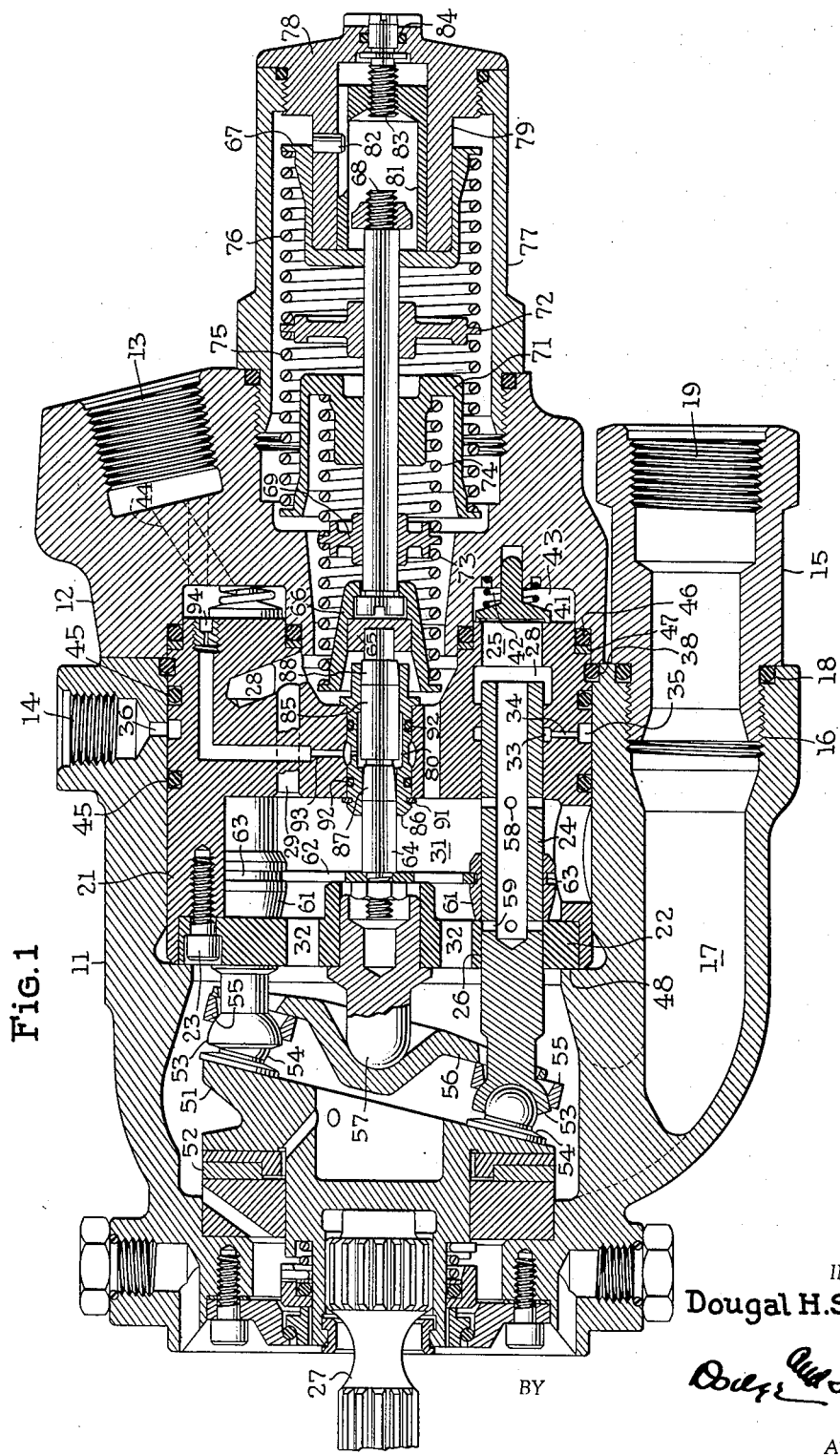

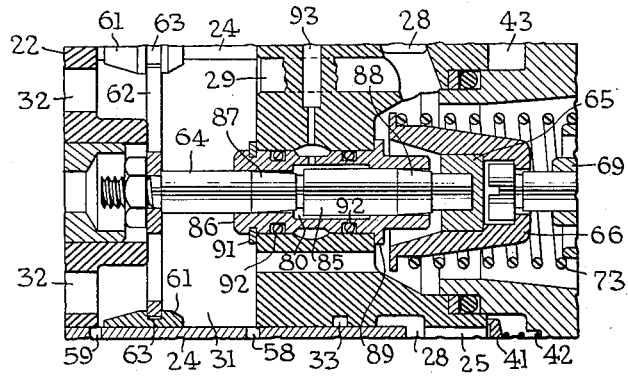
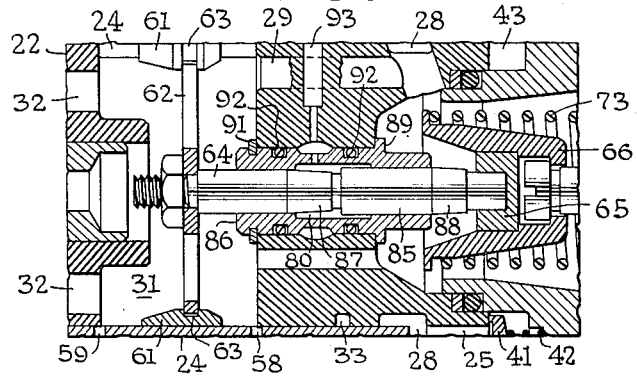
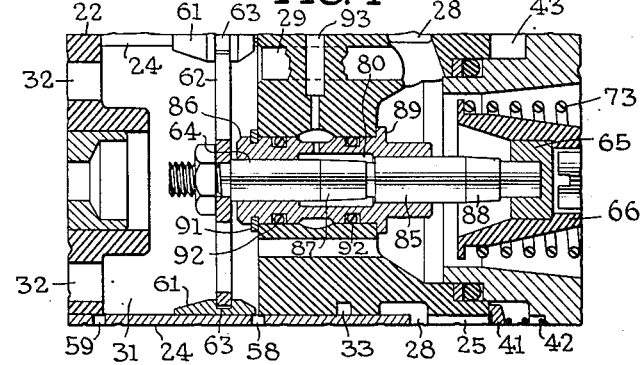

2,778,314

SHARP RESPONSE SPRING LOADED PRESSURE MOTOR FOR CONTROLLING REGULATED DEVICES

Dougal H. Siver, Watertown, N. Y., assignor to The New York Air Brake Company, a corporation of New Jersey Application February 24, 1954, Serial No. 412,239

9 Claims. (Cl. 103—37)

This invention relates to pressure motors which control some other device (such as a valve or the displacement-varying means of a variable displacement pump) in response to pressure.

Consider for example a device for maintaining a head pressure constant by shifting a valve or by shifting the regulating mechanism of a variable displacement pump. The customary scheme is to use a motor piston which is subject in one direction to the head pressure and subject in the opposite direction to the force exerted by a loading spring. This motor piston is connected with and actuates the valve or the regulatory mechanism in question. Since the stress in the spring varies as the piston moves, regulatory movement must start before the desired pressure is closely approached. Often the range of pressure variation while the motor piston is moving is as much as 10% of the desired head pressure. Motion varying cams and linkages to reduce this effect have been tried, but they are merely palliative, and commonly introduce intolerable secondary effects.

The invention attacks the problem on a hydraulic basis, permits direct connection of the motor to the controller which it actuates, and affords close control even in high pressure devices, such as pumps or valves developing or controlling pressures of 3000 p. s. i. or even 3500 p. s. i. It is possible by use of the invention to limit the control range to 1% of the controlled pressure and still have good stability.

Generally stated the invention provides a pressure motor which, in response to its own motion, develops a rising force reaction such as will neutralize, at least in a useful degree, the rising resistance of the loading spring.

The invention will now be described by reference to the accompanying drawings in which:

Fig. 1 is an axial section through a variable delivery pump embodying the invention. The controller is shown in full delivery position.

Fig. 2 is a fragmentary view on a somewhat enlarged scale showing the controlling motor in the full delivery position of Fig. 1.

Fig. 3 is a similar view showing an intermediate position.

Fig. 4 is a similar view showing zero delivery position.

Figure 5:
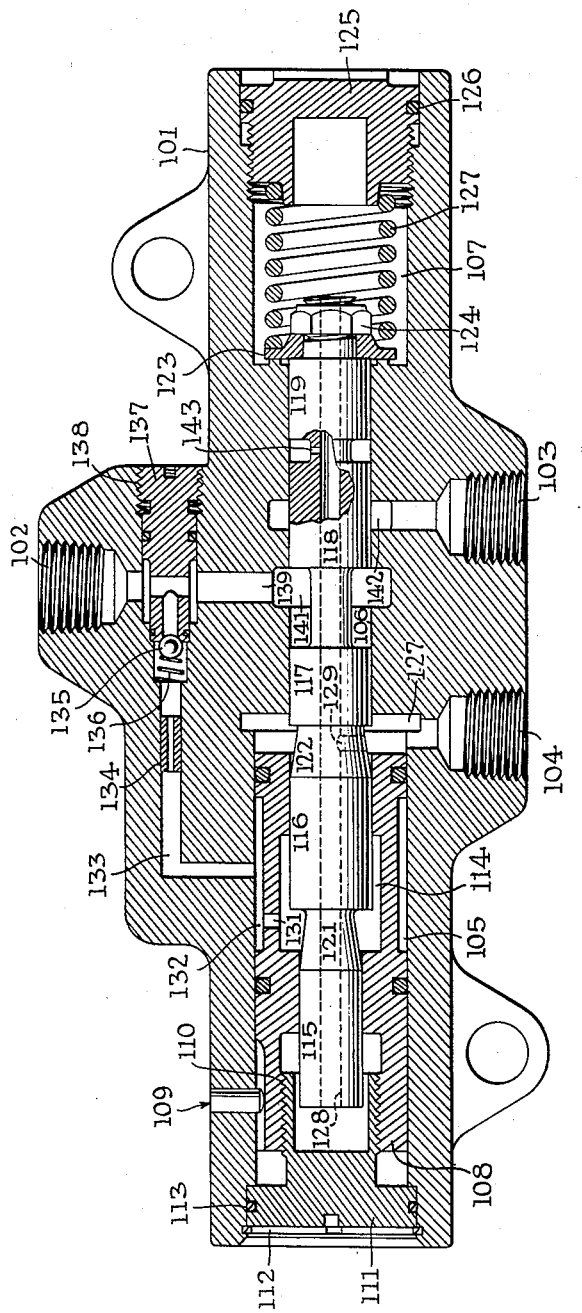
Fig. 5 is an axial section of a relief valve embodying the invention. The valve is in the closed position in which the motor position corresponds to Figs. 1 and 2.

The pump shown in Figures 1–4 is mechanically similar to that described in the patent to Huber 2,664,048 granted December 29, 1953. So far as the present invention is concerned the spill-back sleeve valves may be all alike, as in earlier Huber pumps or use may be made of typical and atypical sleeves as disclosed in Patent 2,664,048 and there claimed.

All statements of direction refer to the pump positioned as in Figure 1.

The pump housing comprises a main body portion 11 and a cap 12. A threaded connection 13 for the main discharge line is formed in cap 12. A smaller threaded connection 14 for the by-pass line is formed in body 11. A fitting 15 is threaded at 16 into the entrance end of inlet passage 17 and sealed by gasket 18. Passage 17 leads directly to the swash plate chamber. The fitting 15 is threaded at 19 to receive the suction line.

The by-pass connection 14 commonly would return by-passed liquid (oil) to the sump of the hydraulic system in which the pump is included, either directly or through some device to be lubricated and cooled. The connection 14 commonly would be and at any rate can be under substantial back-pressure. These details concern the system with which the pump is used and hence do not require elaboration. Whatever becomes of oil by-passed through connection 14, it assures continuous oil flow while the pump is running, so that oil continuously enters through passage 17 and flows in contact with the plunger-actuating mechanism.

The head 12 and body 11 are held together by threaded connections, not visible in the drawing and confine between them the cup shaped cylinder block 21 and the guide block 22 which is in the form of a disc or plate, whose periphery is received in an annular rebate formed in the rim portion of the cylinder block. (See Figure 1.) Screws 23 are used to hold the parts 21, 22 assembled and to maintain alinement of the guides and corresponding cylinders.

The illustrated pump has nine plungers 24. Consequently the block 21 has nine cylinders 25 and the guide block 22 has nine guide ways 26, each axially alined with a corresponding cylinder. The axes of the plungers are parallel and are uniformly spaced in circular arrangement around the axes of the cylinder blocks 21 and 22 and also around the axis of the drive shaft 27.

Each cylinder 25 has an annular inlet port 28 fed by a passage 29 bored in cylinder block 21. These lead from the spill-back valve-space 31 enclosed between the cylinder block 21 and the guide block 22. Passages 32 connect space 31 with passage 17.

To the left of port 28 each plunger 24 is guided in block 21 for a considerable distance, and formed in this guide portion is an annular by-pass port 33, one for each plunger. A passage 34 leads from each port 33 to the bottom of an annular channel 35, which encircles cylinder block 21 and connects with drilled port 36. This leads to the threaded connection 14.

The end of each cylinder 25 is closed by a discharge valve 41 which is urged to its seat on block 21 by a coil compression spring 42. The valves are housed in an annular space 43 between block 21 and cap 12, and connected with discharge connection 13 by passage 44. The cap 12 is formed with seats for springs 42 and with a guide way for the axial stem of each valve as clearly shown in Fig. 1.

It is contemplated that space 43 will be maintained at high pressure, pressures of 3000 p. s. i. being everyday practice and pressures of at least 5000 p. s. i. being attainable. They will be used whenever apparatus to use them becomes available.

The block 21 is sealed to body 11 by toric gaskets 45 on opposite sides of channel 35 and to cap 12 by toric gasket 46 and the filler ring 47. A toric gasket 38 is mounted in an annular groove cut part in the cylinder block 21 and part in housing 11 and engages these parts and cap 12. Pressure in space 43 forces the blocks 21, 22 against shoulder 48 so that they are positively positioned.

Shaft 27 drives swash plate 51 which is sustained by thrust bearing 52. Each plunger 24 has a hemispherical enlarged end 53 in which is socketed a universally tiltable slipper 54 and against which is seated a universally tiltable thrust ring 55. The slippers 54 engage the face of swash plate 51 and the rings 55 engage the plate face of a nutating plate 56. Plate 56 tilts on a hemispherical thrust journal 57 and has notches at its periphery to receive the necks of plungers 24 which pass freely therethrough.

The axes of tilt of each slipper and its related ring are coincident and the plane face of plate 56 engaged by the rings 55 passes through the axis of spherical journal 57. Any suitable geometrically similar reciprocating mechanism might be substituted, so far as the present invention is concerned.

Each plunger 24 has several radial by-pass ports 58 and several radial spill-back ports 59. Four of each have proved satisfactory and are illustrated.

Ports 58 are so located that they open into space 31 when their plungers are fully retracted and are blanked by block 21 before the end of the plunger closes the inlet port 28. Near and at the end of the displacement stroke they communicate with their corresponding by-pass ports 33.

Ports 59 are so located that in the fully retracted position of their plungers they communicate with space 31. On their displacement strokes they are controlled by the corresponding spill-back sleeve 61, all of which are positioned by the spider 62 which engages the annular groove 63 in each valve. As stated it is immaterial to the present invention whether the sleeve valves 61 are all alike as in the earlier Huber patents or are differentiated according to Patent 2,664,048.

Spider 62 is carried on the end of a piston rod 64 which is biased toward the left (toward full delivery position) by a spring assembly reacting on the head 65 mounted on the end of rod 64. This assembly comprises a spring-seat 66 seated on head 65, a spring seat 67 supported on head 12 (by means to be described hereinafter) a tie-bolt 68 connecting the spring seats and limiting their separation (for convenience in assembling) three intermediate spring seats 69, 71 and 72, all slidable on bolt 68 and four coil compression springs 73, 74, 75 and 76 arranged in series.

The spring 75 partly encircles the spring 74, the purpose being to permit the use of a long spring assembly and still keep the total length of the spring assembly within reasonable limits. The desire to use a long spring arises from the importance of keeping "scale" (i. e. the increase of resistance with compression) as low as is practicable. Scale of the loading spring is a detrimental factor because (other factors being unchanged), it increases the range of pressure necessary to move the controller (spider 62) from full delivery to zero delivery positions.

To enclose and sustain the spring assembly, a tube 77 is mounted coaxially in cap 12 and is closed at its outer end by plug 78 which has an inward-extending guide tube 79 on which spring-seat 67 is guided. Sealing toric gaskets are used as shown. Guided in tube 79 is a thrust member 81, held against rotation by pin 82 which engages a longitudinal slot, and adjusted by a threaded stem 83 which is swiveled at 84 in plug 78 and is threaded into the end of thrust member 81. The stem is sealed by a toric gasket. By turning stem 83 the spring stress may be adjusted.

As so far described, the pump conforms basically to prior practice except that the spring assembly is somewhat more elaborate than that heretofore used. The spider 62 is typical of controllers which are loaded solely by a biasing spring, for obviously the spider 62 and related parts are indifferent to pressures in space 31 or substantially so.

The invention is concerned with a pressure motor responsive to discharge pressure (in connection 13), and so contrived as to neutralize the scale of the loading spring to almost any desired degree.

This result is secured by modifying the motor which responds to head pressure in the pump, as will now be explained.

The rod 64 has a coaxial cylindrical enlargement 85 to afford at their junction an annular shoulder which serves as a piston. Parts 64 and 85 extend through a cylinder bushing 86 just as they do in the Huber patent above mentioned, but within the two bores of the bushing the two include portions 87 and 88 tapered in the same direction and so located that when rod 64 is to the left as in Figures 1 and 2 there are relatively short leakage paths from the cylinder space 80 along both portions 64 and 85 of the rod. The tapered portions are not necessarily equal in length. At part stroke (Figure 3) the leakage path along 85 has reached its maximum length and that along 64 is approaching its maximum length. At full stroke both have attained maximum length.

The cylinder bushing 86 is retained by a flange 89 at one end and a snap ring 91 at the other and is sealed by toric gaskets 92. The gaskets 92 are on opposite sides of a port 93 which leads from the pump discharge passage 43 by way of a choke 94 to the cylinder space 80.

The identified Huber patent includes a choke (there numbered 68) which was used to damp out pressure pulses so that they would not cause serious pulsations in the cylinder space. As used in the present device the choke 94 retains that function, but it acquires a new and very important additional function.

The tapered portions 87 and 88 are important, not so much because they are tapered as because they offer free flow paths and consequently shorten the leakage paths along rod 64 and enlargement 85 when the parts are in the position of Figures 1 and 2. The choke 94 is so chosen that leakage along 64 and 85 is sufficient to retard the development of a really effective pressure in cylinder 80 until the desired head pressure is approached in passage 43.

When the desired head pressure is approached the flow into the motor cylinder will be sufficient to raise motor pressure above the set resistance of the spring and the motor starts to move. This motion lengthens the leakage path and reduces the leakage, so that motor pressure rises at an increasing rate and neutralizes, at least in part, the rising resistance of the spring. The degree of neutralization can be fixed by design, within reasonable limits.

The tapers are a convenient and perhaps the simplest way to provide for leakage paths of variable length and to assure that no undesirable secondary effect is introduced. Other expedients will readily suggest themselves and a number have been tested with varying degrees of success. Nothing better than the tapers has so far been demonstrated, and hence they have been chosen for illustration.

Pumps of the Huber type, in the early commercial embodiments, when operating against head pressures of 3000 p. s. i. commenced reducing delivery at about 2700 p. s. i. It is a simple matter now using the present invention to raise this value to 2900 p. s. i. or even 2950 p. s. i. and care in the design of the springs to secure low scale, and care in proportioning the choke and the leakage paths has attained full delivery to 2970 p. s. i. without instability and with predictable performance for commercially useful periods. Experience and study are expected to lead to even better results.

The pump controller in Figures 1 to 4 inclusive is a group of valves, and the valves and the spider which actuates them are balanced so as to be indifferent to pressure unless liquid is supplied to inlet 19 under pressure. Since this is sometimes done two possibilities require discussion. If the supply is under pressure, the pressure assists the loading springs with a force equal to the unit pressure of supply multiplied by the differential between the cross-sectional areas of parts 64 and 85. This normally is a constant force, so correction can be made by adjusting the spring stress. If the inlet flow is not under pressure the assisting force is zero and the spring loading would be lower. In either case the spring exercises control, with only such interference as is caused by friction.

Similar considerations apply to various other pressure-responsive devices such as relief valves, pressure reducing valve, pressure regulating valves, and the like.

To clarify the point, and by way of example, the invention is shown in Figure 5 as used in one type of relief valve. Statements of direction refer to the valve when positioned as in Figure 5.

The valve is enclosed in a housing 101 having an inlet connection 102 for the pressure supply line and outlet connection 103 for relief flow and a drain connection 104 for connection to the low pressure sump or its equivalent. The housing is bored coaxially to three diameters indicated at 105, 106 and 107.

Slidable in bore 105 is an axially adjustable cylinder bushing 108. A spline arrangement 109 is used to prevent rotation while accommodating longitudinal adjustment. The outer end of the bushing 108 is internally threaded to receive the threaded stem 110 formed on a rotatable adjusting member 111 which is swiveled in an annular recess in the end of housing 101. A snap ring 112 confines it and an O-ring gasket 113 seals it against leakage.

The bushing 108 has two coaxial bores of different diameters between which is a cylinder space 114 of still larger diameter. One bore fits the smaller cylindrical portion 115 and the other fits the larger cylindrical portion 116 of a combined differential piston and valve. The effective piston area exposed in cylinder space 114 is equal to the difference in cross-sectional area between the portions 115 and 116. Pressure in space 114 reacts to the right on the combined differential piston and valve. The valve portion comprises three lands 117, 118 and 119 spaced apart by grooves as shown, and all fitting the bore 106. Bore 106 is equal in diameter with that bore in bushing 108 in which piston part 116 fits. To the right of portion 115 is a tapered portion 121 and to the right of portion 116 is a second tapered portion 122, to which further reference will be made.

At its right hand end the combined piston and valve is shouldered down and threaded to receive a spring seat 123 fixedly retained by nut 124. The bore 107 is internally threaded at its outer end to receive an adjustable spring seat 125 which is sealed by toric gasket 126. A coil compression loading spring 127 is confined under stress between the spring seats 123 and 125, leftward motion of the combined piston and valve being limited by the collision of seat 123 with a shoulder at the inner end of bore 107. Consequently the closed position of the valve is determined definitely. It is shown in Figure 5.

The drain connection 104 communicates with and drains the space around taper 122 to the left of land 117. It also drains the spaces at both ends of the combined piston and valve for the valve has an axial bore 128 from end to end with a lateral branch 129 opening on the tapered part 122.

From cylinder space 114 a port 131 leads to the annular groove 132 surrounding bushing 108 and communicating with port 133 in housing 101 in all positions of bushing 108.

Port 133 and inlet connection 102 communicate through choke 134. This can be a simple, constant communication unless delayed closing of the valve is desired. When delayed closing is desired, a check valve is interposed, and one is shown in Figure 5.

The check valve 135 is lightly urged by spring 136 toward the seat on the inner end of ported plug 137. This plug is threaded at 138 into body 101 and is sealed by toric gaskets, as shown. The valve and spring may readily be removed and the plug replaced.

There is also direct communication from inlet connection 102 via passage 139 to annular port 141 which surrounds bore 106 and is between lands 117 and 118 in all positions of the combined piston and valve. Outlet connection 103 is in free communication with annular port 142 spaced to the right from port 141.

When the piston and valve moves far enough to the right, land 118 exposes port 142 and ports 141 and 142 are connected by the interval between lands 117 and 118.

A drainage port 143 leads to axial bore 128 from the groove between lands 118 and 119.

The valve operates as follows: The supply pressure is effective in cylinder 114 and there acts to the right on the piston upon an area equal to difference of cross-section of the cylindrical portions 115 and 116. Spring 127 is initially so stressed that the valve is held to the left until the desired limiting pressure is closely approached. When the piston starts to move, the leakage paths along surfaces 115 and 116 are each increased in length. Just before the valve started to open, the leakage along 115 and 116 approximately balanced the supply through choke 134. Restriction of the leakage flow caused by motion of the valve allows supply to gain rather sharply on leakage, and continued motion causes inlet flow to gain at an ever increasing rate over leakage flow. Hence the motor develops a rising force reaction to neutralize, at least in part, the rising force reaction of the spring.

Longitudinal adjustment of bushing 108 affects the initial leakage and the pattern of leakage-reduction incident to motion of the piston-and-valve unit, and is a feature not incorporated in the pump embodiment of Figures 1–4. Aside from this the motor characteristics are quite similar, though the valve characteristics are quite different.

In the pump control embodiment the motor operates over a considerable regulatory range without disturbing effect on the restricted flow to the regulatory motor. This favors stability. With the valve the change from valve-closed to valve-open condition results in the conversion of part of the pressure head into velocity head and causes reactions which are potentially disturbing. A drop in the pressure head which occurs upon the opening of the valve tends to slow the supply of liquid through choke 134 and thus neutralize in some degree the effect of the lengthened leakage path from the motor.

In a relief valve the range of pressure-responsive control, beyond the point at which the valve opens, is small. Hence the invention as applied to relief and pressure regulatory valves, requires very careful design to make it effective in a useful degree. As applied to a variable delivery pump, particularly a pump of the type described which is indifferent to pressure and velocity effects, the invention has demonstrated remarkable utility.

I claim:

1. The combination of means enclosing a space in which fluid pressure is effective; a controller movable from a neutral position toward a position in which it serves to limit said fluid pressure; an expansible chamber motor comprising means enclosing a motor chamber and a movable abutment subject to pressure in said motor chamber; an actuating connection between said abutment and said controller through which motion of the abutment in response to rising fluid pressure causes motion of said controller toward its pressure limiting position; means affording a restricted inlet connection from said enclosed space to said motor chamber; spring means biasing said abutment in opposition to pressure in said motor chamber with a minimum force approximately sufficient to balance a desired pressure; and adjustable flow restricting means controlling a bleed passage from said motor chamber and adjusted by motion of said abutment, said flow-restricting means having a maximum flow capacity approximating that of said restricted inlet communication, from which maximum the flow-restricting means reduces the bleed flow as the abutment moves the controller in the pressure limiting direction.

2. The combination defined in claim 1 in which the controller is a valve.

3. The combination defined in claim 1 in which the controller comprises valve means balanced as to the pressure of fluid whose flow it controls.

4. The combination defined in claim 1 in which the expansible chamber motor is of the differential-piston type comprising a cylinder with coaxial bores of different diameters and a plunger having cylindrical portions of two diameters to fit respective ones of said bores, and the adjustable flow-restricting means depends on leakage from the cylinder between at least one of said cylindrical portions and the bore in which it works and includes a reduced portion of the plunger one end of which moves with the plunger in a range including a substantial portion of the length of the related bore, and the other end opens into a space at low pressure.

5. The combination defined in claim 1 in which the expansible chamber motor is of the differential piston type comprising a cylinder with coaxial bores of different diameters and a plunger having cylindrical portions of two diameters to fit respective ones of said bores, and the adjustable flow-restricting means depends on leakage from the cylinder between each of said cylindrical portions and respective ones of said bores, and each of said cylindrical portions has a reduced portion one end of which moves with the plunger in a range including a substantial portion of the length of the related bore, and the other end opens into a space at low pressure.

6. The combination defined in claim 1 in which the expansible chamber motor is of the differential piston type comprising a cylinder mounted to move in the direction of its axis and having coaxial bores of different diameters and a plunger having cylindrical portions of two diameters to fit respective ones of said bores and the adjustable flow-restricting means depends on leakage from the cylinder between each of said cylindrical portions and respective ones of said bores, at least one of said cylindrical portions having a reduced portion one end of which moves with the plunger in a range including a substantial portion of the length of the related bore and the other end opens into a space at low pressure; and manually operable adjusting means are provided to change the axial position of said cylinder.

7. The combination defined in claim 1 in which the expansible chamber motor is of the differential piston type comprising a cylinder mounted to move in the direction of its axis and having coaxial bores of different diameters and a plunger having cylindrical portions of two diameters to fit respective ones of said bores and the adjustable flow-restricting means depends on leakage from the cylinder between each of said cylindrical portions and respective ones of said bores, at least one of said cylindrical portions having a reduced portion one end of which moves with the plunger in a range including a substantial portion of the length of the related bore and the other end opens into a space at low pressure; and manually adjustable means are provided to vary the stress in said spring means.

8. The combination of means enclosing a space in which a desired pressure is to be maintained; a pump connected to deliver fluid under pressure thereto and including a controller shiftable to reduce pump delivery from full delivery substantially to zero; an expansible chamber motor having a motor chamber and a movable abutment subject to pressure in said motor chamber; connections through which said abutment, as it moves in response to pressure in said motor chamber, moves said controller toward its zero delivery position; means affording a restricted communication between said fluid-confining means and said motor chamber; spring means biasing said abutment in opposition to fluid pressure in said motor chamber with a minimum force approximately sufficient to balance said desired pressure when the latter is effective in the motor chamber; and throttling bleed means for said motor chamber having a maximum capacity approximating the flow capacity of said restricted communication, controlled by motion of said abutment and arranged to reduce the bleed as the controller approaches said zero delivery position.

9. The combination of means enclosing a space in which a definite pressure is to be maintained; a pump connected to deliver fluid under pressure to said space, said pump including a mechanism operable between definite limits to vary the delivery of the pump between a maximum and substantially zero; a spring biasing said mechanism toward its maximum pump-delivery limit, said spring having a force reaction which varies progressively between said limits; an expansible chamber motor connected to urge said mechanism toward its zero pump-delivery limit in response to pressure developed continuously in said motor, said motor having a leakage characteristic which varies progressively with the position of the motor in inverse relation to the force reaction of said spring between a relatively high value at the maximum pump-delivery limit to a relatively low value at the zero pump-delivery limit; and a flow connection from said space to said motor, so restricted that when said space is at said definite pressure, the flow to the motor is sufficient to neutralize said maximum leakage from the motor.

References Cited in the file of this patent

UNITED STATES PATENTS 2,664,048    Huber _____ Dec. 29, 1953